(12) United States Patent
Borgerding et al.

(10) Patent No.: US 11,422,629 B2
(45) Date of Patent: Aug. 23, 2022

(54) SYSTEMS AND METHODS FOR INTELLIGENT WAVEFORM INTERRUPTION

(71) Applicant: Joyson Safety Systems Acquisition LLC, Auburn Hills, MI (US)

(72) Inventors: Nicholas Borgerding, Auburn Hills, MI (US); Jason Lisseman, Macomb, MI (US)

(73) Assignee: Joyson Safety Systems Acquisition LLC, Auburn Hills, MI (US)

( * ) Notice: Subject to any disclaimer, the term of this patent is extended or adjusted under 35 U.S.C. 154(b) by 0 days.

(21) Appl. No.: 17/127,229

(22) Filed: Dec. 18, 2020

(65) Prior Publication Data

US 2021/0200315 A1    Jul. 1, 2021

Related U.S. Application Data

(60) Provisional application No. 62/955,335, filed on Dec. 30, 2019.

(51) Int. Cl.
| | |
|---|---|
| *G06F 3/01* | (2006.01) |
| *G06F 3/041* | (2006.01) |
| *G06F 3/16* | (2006.01) |

(52) U.S. Cl.
CPC ............ *G06F 3/016* (2013.01); *G06F 3/0414* (2013.01); *G06F 3/0416* (2013.01); *G06F 3/16* (2013.01)

(58) Field of Classification Search
CPC ...... G06F 3/016; G06F 3/0414; G06F 3/0416; G06F 3/16
See application file for complete search history.

(56) References Cited

U.S. PATENT DOCUMENTS

| 4,484,026 A | 11/1984 | Thornburg |
| 4,540,979 A | 9/1985 | Gerger et al. |

(Continued)

FOREIGN PATENT DOCUMENTS

| EP | 1607850 | 12/2005 |
| JP | 06-037056 U | 5/1994 |

(Continued)

OTHER PUBLICATIONS

International Search Report and Written Opinion issued for Application No. PCT/US2020/065794, dated Apr. 8, 2021.

*Primary Examiner* — Ryan A Lubit
(74) *Attorney, Agent, or Firm* — Meunier Carlin & Curfman LLC

(57) ABSTRACT

Various implementations provide intelligent interruption of waveform-based feedback. Various systems and methods coordinate a transition from a current waveform associated with a current feedback control signal to a subsequent waveform associated with a subsequent feedback control signal such that an amplitude and a direction of a beginning of the subsequent waveform matches an amplitude and a direction of an ending of the current waveform. For example, various implementations include an electronic device that includes a touch sensitive interface, a waveform actuator, a memory, and a processor. The touch sensitive interface includes one or more touch sensors and a touch surface. The touch sensors identify a touch event on the touch surface. For example, touch sensors may include force-based sensors (e.g., MEMS sensors).

19 Claims, 7 Drawing Sheets

(56) References Cited

U.S. PATENT DOCUMENTS

| | | |
|---|---|---|
| 4,801,771 A | 1/1989 | Mizuguchi et al. |
| 4,929,934 A | 5/1990 | Ueda et al. |
| 5,165,897 A * | 11/1992 | Johnson .............. G06F 3/011 |
| | | 601/84 |
| 5,398,962 A | 3/1995 | Kropp |
| 5,408,873 A | 4/1995 | Schmidt et al. |
| 5,423,569 A | 6/1995 | Reighard et al. |
| 5,453,941 A | 9/1995 | Yoshikawa |
| 5,463,258 A | 10/1995 | Filion et al. |
| 5,539,259 A | 7/1996 | Filion et al. |
| 5,793,297 A | 8/1998 | Takeuchi et al. |
| 5,855,144 A | 1/1999 | Parada |
| 5,871,063 A | 2/1999 | Young |
| 5,914,658 A | 6/1999 | Arakawa |
| 5,943,044 A | 8/1999 | Martinelli |
| 5,965,952 A | 10/1999 | Podoloff et al. |
| 6,067,077 A | 5/2000 | Martin |
| 6,333,736 B1 | 12/2001 | Sandbach |
| 6,378,384 B1 | 4/2002 | Atkinson et al. |
| 6,429,846 B2 | 8/2002 | Rosenberg et al. |
| 6,501,463 B1 | 12/2002 | Dahley et al. |
| 6,636,197 B1 | 10/2003 | Goldberg et al. |
| 6,809,462 B2 | 10/2004 | Pelrine et al. |
| 6,906,700 B1 | 6/2005 | Armstrong |
| 6,933,920 B2 | 8/2005 | Lacroix et al. |
| 7,126,583 B1 | 10/2006 | Breed |
| 7,136,051 B2 | 11/2006 | Hein et al. |
| 7,258,026 B2 | 8/2007 | Papakostas et al. |
| 7,649,278 B2 | 1/2010 | Yoshida et al. |
| 7,742,036 B2 * | 6/2010 | Grant .................. H04M 19/04 |
| | | 345/157 |
| 8,203,454 B2 | 6/2012 | Knight et al. |
| 8,214,105 B2 | 7/2012 | Daly et al. |
| 8,222,799 B2 | 7/2012 | Polyakov et al. |
| 8,237,324 B2 | 8/2012 | Pei et al. |
| 8,269,731 B2 | 9/2012 | Molne |
| 8,633,916 B2 | 1/2014 | Bernstein |
| 8,698,764 B1 | 4/2014 | Karakotsios et al. |
| 9,007,190 B2 | 4/2015 | Bosch et al. |
| 9,244,562 B1 | 1/2016 | Rosenberg |
| 9,337,832 B2 | 5/2016 | Buttolo |
| 9,690,380 B2 | 6/2017 | Monkhouse et al. |
| 9,727,031 B2 | 8/2017 | Lisseman et al. |
| 9,829,980 B2 | 11/2017 | Lisseman et al. |
| 9,864,507 B2 | 1/2018 | Cheng |
| 10,007,342 B2 | 6/2018 | Lisseman et al. |
| 10,180,723 B2 | 1/2019 | Lisseman et al. |
| 2002/0054060 A1 | 5/2002 | Schena |
| 2003/0043014 A1 | 3/2003 | Nakazawa et al. |
| 2003/0076968 A1 | 4/2003 | Rast |
| 2003/0083131 A1 | 5/2003 | Armstrong |
| 2003/0206162 A1 | 11/2003 | Roberts |
| 2004/0021643 A1 | 2/2004 | Hoshino |
| 2004/0195031 A1 | 10/2004 | Nagasaka |
| 2005/0021190 A1 | 1/2005 | Worrell et al. |
| 2005/0052426 A1 | 3/2005 | Hagermoser et al. |
| 2005/0063757 A1 | 3/2005 | Sugimura et al. |
| 2005/0067889 A1 | 3/2005 | Chernoff |
| 2005/0110769 A1 | 5/2005 | DaCosta et al. |
| 2005/0156892 A1 | 7/2005 | Grant |
| 2005/0273218 A1 | 12/2005 | Breed et al. |
| 2006/0025897 A1 | 2/2006 | Shostak et al. |
| 2006/0054479 A1 | 3/2006 | Iisaka |
| 2006/0076855 A1 | 4/2006 | Eriksen et al. |
| 2006/0109256 A1 | 5/2006 | Grant |
| 2006/0113880 A1 | 6/2006 | Pei et al. |
| 2006/0177212 A1 | 8/2006 | Lamborghini et al. |
| 2006/0248478 A1 | 11/2006 | Lian |
| 2006/0262103 A1 | 11/2006 | Hu |
| 2006/0284839 A1 | 12/2006 | Breed |
| 2007/0062753 A1 | 3/2007 | Yoshida et al. |
| 2007/0097073 A1 | 5/2007 | Takashima |
| 2007/0100523 A1 | 5/2007 | Trachte |
| 2007/0129046 A1 | 6/2007 | Soh et al. |
| 2007/0287494 A1 | 12/2007 | You et al. |
| 2008/0012837 A1 | 1/2008 | Marriott et al. |
| 2008/0062145 A1 | 3/2008 | Shahoian |
| 2008/0079604 A1 | 4/2008 | Madonna et al. |
| 2008/0150911 A1 | 6/2008 | Harrison |
| 2008/0202912 A1 | 8/2008 | Boddie et al. |
| 2008/0264183 A1 | 10/2008 | Graham et al. |
| 2008/0289887 A1 | 11/2008 | Flint et al. |
| 2009/0001855 A1 | 1/2009 | Lipton |
| 2009/0020343 A1 | 1/2009 | Rothkopf et al. |
| 2009/0125811 A1 | 5/2009 | Bethurum |
| 2009/0140994 A1 | 6/2009 | Tanaka et al. |
| 2009/0140996 A1 | 6/2009 | Takashima et al. |
| 2009/0151447 A1 | 6/2009 | Jin et al. |
| 2009/0153340 A1 | 6/2009 | Pinder et al. |
| 2009/0160529 A1 | 6/2009 | Lamborghini |
| 2009/0189749 A1 | 7/2009 | Salada |
| 2009/0228791 A1 | 9/2009 | Kim et al. |
| 2009/0237374 A1 | 9/2009 | Li et al. |
| 2009/0241378 A1 | 10/2009 | Ellis |
| 2010/0001974 A1 | 1/2010 | Su et al. |
| 2010/0045612 A1 | 2/2010 | Molne |
| 2010/0053087 A1 | 3/2010 | Dai |
| 2010/0066512 A1 | 3/2010 | Rank |
| 2010/0141606 A1 | 6/2010 | Bae |
| 2010/0168998 A1 | 7/2010 | Matsunaga |
| 2010/0200375 A1 | 8/2010 | Han et al. |
| 2010/0226075 A1 | 9/2010 | Jahge |
| 2010/0236911 A1 | 9/2010 | Wild et al. |
| 2010/0250066 A1 | 9/2010 | Eckstein et al. |
| 2010/0250071 A1 | 9/2010 | Pala et al. |
| 2010/0268426 A1 | 10/2010 | Pathak |
| 2010/0302177 A1 | 12/2010 | Kim et al. |
| 2010/0315267 A1 | 12/2010 | Chung et al. |
| 2010/0321335 A1 | 12/2010 | Seong-Taek et al. |
| 2010/0328112 A1 | 12/2010 | Liu et al. |
| 2011/0037721 A1 | 2/2011 | Cranfill et al. |
| 2011/0046788 A1 | 2/2011 | Daly et al. |
| 2011/0054359 A1 | 3/2011 | Sazonov et al. |
| 2011/0061947 A1 | 3/2011 | Krah et al. |
| 2011/0069021 A1 | 3/2011 | Hill |
| 2011/0109552 A1 | 5/2011 | Yasutake |
| 2011/0141052 A1 | 6/2011 | Bernstein et al. |
| 2011/0148608 A1 | 6/2011 | Grant |
| 2011/0175844 A1 | 7/2011 | Berggren |
| 2011/0205081 A1 | 8/2011 | Chen |
| 2011/0210926 A1 | 9/2011 | Pasquero et al. |
| 2011/0216015 A1 | 9/2011 | Edwards |
| 2011/0227872 A1 | 9/2011 | Huska |
| 2011/0241850 A1 | 10/2011 | Bosch et al. |
| 2011/0245992 A1 | 10/2011 | Stahlin et al. |
| 2011/0248728 A1 | 10/2011 | Maruyama |
| 2011/0255023 A1 | 10/2011 | Doyle et al. |
| 2011/0260983 A1 | 10/2011 | Pertuit et al. |
| 2011/0267181 A1 | 11/2011 | Kildal |
| 2011/0279380 A1 | 11/2011 | Weber et al. |
| 2011/0290038 A1 | 12/2011 | Hoshino et al. |
| 2012/0013573 A1 | 1/2012 | Liu et al. |
| 2012/0038468 A1 | 2/2012 | Provancher |
| 2012/0039494 A1 | 2/2012 | Ellis |
| 2012/0062491 A1 | 3/2012 | Coni |
| 2012/0105367 A1 | 5/2012 | Son et al. |
| 2012/0126959 A1 | 5/2012 | Zarrabi et al. |
| 2012/0127115 A1 | 5/2012 | Gannon |
| 2012/0169663 A1 | 7/2012 | Kim et al. |
| 2012/0223900 A1 | 9/2012 | Jiyama |
| 2012/0267221 A1 | 10/2012 | Gohng et al. |
| 2012/0267222 A1 | 10/2012 | Gohng et al. |
| 2012/0296528 A1 | 11/2012 | Wellhoefer et al. |
| 2012/0299856 A1 | 11/2012 | Hasui |
| 2013/0016053 A1 | 1/2013 | Jung et al. |
| 2013/0063380 A1 | 3/2013 | Wang et al. |
| 2013/0063389 A1 | 3/2013 | Moore |
| 2013/0093679 A1 | 4/2013 | Dickinson et al. |
| 2013/0096849 A1 | 4/2013 | Campbell et al. |
| 2013/0106691 A1 | 5/2013 | Rank |
| 2013/0113715 A1 | 5/2013 | Grant et al. |
| 2013/0113717 A1 | 5/2013 | Van Eerd et al. |
| 2013/0122857 A1 | 5/2013 | Karaogu et al. |
| 2013/0128587 A1 | 5/2013 | Lisseman et al. |

(56) References Cited

U.S. PATENT DOCUMENTS

| | | |
|---|---|---|
| 2013/0141396 A1 | 6/2013 | Lynn et al. |
| 2013/0147284 A1 | 6/2013 | Chun |
| 2013/0154938 A1 | 6/2013 | Arthur et al. |
| 2013/0181931 A1 | 7/2013 | Kenta |
| 2013/0218488 A1 | 8/2013 | Grandemange et al. |
| 2013/0222287 A1 | 8/2013 | Bae et al. |
| 2013/0222310 A1 | 8/2013 | Birnbaum et al. |
| 2013/0228023 A1 | 9/2013 | Drasnin et al. |
| 2013/0250213 A1 | 9/2013 | Tomomasa |
| 2013/0250502 A1 | 9/2013 | Tossavainen |
| 2013/0250613 A1 | 9/2013 | Kamada |
| 2013/0257754 A1 | 10/2013 | Liu et al. |
| 2013/0257776 A1 | 10/2013 | Tissot |
| 2013/0265273 A1 | 10/2013 | Marsden et al. |
| 2013/0282240 A1 | 10/2013 | Nada et al. |
| 2013/0307788 A1 | 11/2013 | Rao et al. |
| 2013/0342337 A1 | 12/2013 | Kiefer et al. |
| 2014/0028577 A1 | 1/2014 | Krah et al. |
| 2014/0071060 A1 | 3/2014 | Santos-Gomez |
| 2014/0092025 A1 | 4/2014 | Pala et al. |
| 2014/0114624 A1 | 4/2014 | Buchanan et al. |
| 2014/0191973 A1 | 7/2014 | Zellers |
| 2014/0267076 A1 | 9/2014 | Birnbaum et al. |
| 2014/0267113 A1 | 9/2014 | Lisseman et al. |
| 2014/0267114 A1 | 9/2014 | Lisseman et al. |
| 2014/0347176 A1 | 11/2014 | Modarres et al. |
| 2014/0354568 A1 | 12/2014 | Andrews et al. |
| 2015/0009164 A1 | 1/2015 | Shinozaki et al. |
| 2015/0009168 A1 | 1/2015 | Olien et al. |
| 2015/0046825 A1 | 2/2015 | Li |
| 2015/0077373 A1 | 3/2015 | Pance et al. |
| 2015/0084878 A1* | 3/2015 | Kim .................. G06F 3/04883 345/173 |
| 2015/0097794 A1 | 4/2015 | Lisseman |
| 2015/0097795 A1 | 4/2015 | Lisseman et al. |
| 2015/0116205 A1 | 4/2015 | Westerman |
| 2015/0212571 A1 | 7/2015 | Kitada |
| 2015/0309576 A1 | 10/2015 | Tissot |
| 2016/0103541 A1 | 4/2016 | Andrews et al. |
| 2016/0109949 A1 | 4/2016 | Park |
| 2016/0216764 A1 | 7/2016 | Morrell |
| 2016/0342229 A1 | 11/2016 | Andrews et al. |
| 2017/0075424 A1 | 3/2017 | Bernstein |
| 2018/0113512 A1* | 4/2018 | Kang .................. G06F 3/0482 |
| 2018/0129292 A1* | 5/2018 | Moussette ............ G06F 3/0488 |
| 2018/0203511 A1 | 7/2018 | Lisseman et al. |

FOREIGN PATENT DOCUMENTS

| | | |
|---|---|---|
| JP | 2000-71809 | 3/2000 |
| JP | 2005-175815 | 6/2005 |
| JP | 2006-150865 | 6/2006 |
| JP | 2008-123429 | 5/2008 |
| JP | 2008-181709 | 8/2008 |
| JP | 2008-299866 | 12/2008 |
| JP | 2011-3188 A | 1/2011 |
| JP | 2012-73785 | 4/2012 |
| JP | 2012-150833 | 8/2012 |
| JP | 2012-155628 | 8/2012 |
| JP | 2012176640 | 9/2012 |
| JP | 2013-513865 | 4/2013 |
| JP | 2013-182528 | 9/2013 |
| KR | 1020060047110 | 5/2006 |
| KR | 1020100129424 | 12/2010 |
| KR | 1020120103670 | 9/2012 |
| WO | 2001088935 | 11/2001 |
| WO | 2011008292 | 1/2011 |
| WO | 2012/052635 | 4/2012 |
| WO | 2013082293 | 6/2013 |
| WO | 2013154720 | 10/2013 |
| WO | 2014194192 | 12/2014 |
| WO | 2015054354 | 4/2015 |
| WO | 2015054362 | 4/2015 |
| WO | 2015054364 | 4/2015 |
| WO | 2015054369 | 4/2015 |
| WO | 2015054373 | 4/2015 |

* cited by examiner

SYSTEMS AND METHODS FOR INTELLIGENT WAVEFORM INTERRUPTION

CROSS-REFERENCE TO RELATED APPLICATION

This application claims priority to and benefit of U.S. provisional patent application Ser. No. 62/955,335 filed Dec. 30, 2019, which is fully incorporated by reference and made a part hereof.

BACKGROUND

Conventional control systems in vehicles typically present operators with a combination of mechanical, single-function controls such as switches, buttons, levers, knobs, dials, etc. The operator interacts with these control systems by manipulating the controls to execute various control functions. As the number of controllable features increases, switch panels can easily become cluttered with numerous switches, buttons, levers, knobs, and dials.

To reduce the amount of clutter in control panels and to keep up with consumer demand for greater switching functionality, some control systems have implemented the use of electronic touch sensitive sensor devices (e.g., having force-based, capacitive, piezo resistive, or mechanical sensors) having tactile feedback responses to notify a user that a touch input has been received by the device. The tactile feedback may be provided by a waveform actuator that generates a waveform. However, if the tactile feedback response is changed based on the input received and the waveform generated is changed at the point of interruption, the change in the waveform generated may cause a discontinuous tactile sensation. For example, the amplitude and/or direction of the end of the first waveform signal and the beginning of the second waveform signal may not be the same at the point of transition. FIGS. 1A-1C show a first waveform signal, a second waveform signal, and the discontinuity in the transition between the waveform signals resulting from switching from the first waveform signal to the second waveform signal at the point of interruption. As an example, in some instance at the point of transition, the direction of the end of first waveform signal is negative and the direction of the beginning of the second waveform signal is positive, thus causing a discontinuity.

Thus, systems and methods are desired for improving upon the tactile feedback provided in response to a change in the input received.

SUMMARY

In one aspect, an electronic device is disclosed. One embodiment of comprises a touch sensitive interface comprising one or more touch sensors and a touch surface, the touch sensors identifying a touch event on the touch surface; a waveform actuator; a memory; and a processor. The processor is in electrical communication with the one or more touch sensors, the waveform actuator, and the memory. The processor executes instructions stored on the memory, the instructions causing the processor to: receive a touch signal from the one or more touch sensors; select a feedback control signal from a plurality of feedback control signals based on the touch signal received, the selected feedback control signal causing the waveform actuator to propagate at least one pressure wave comprising a waveform, wherein the waveform for each of the feedback control signals is different; and in response to the touch signal received causing a subsequent feedback control signal to be selected that is different from a current feedback control signal, coordinate a transition from a current waveform associated with the current feedback control signal to a subsequent waveform associated with the subsequent feedback control signal such that an amplitude and a direction of a beginning of the subsequent waveform matches an amplitude and a direction of an ending of the current waveform. It is to be appreciated that the direction of the current waveform is negative when the current waveform has a negative slope, and the direction of the current waveform is positive when the current waveform has a positive slope. Likewise, the direction of the subsequent waveform is negative when the subsequent waveform has a negative slope, and the direction of the subsequent waveform is positive when the subsequent waveform has a positive slope.

In some aspects, the processor of the electronic device causes the transition to occur when the amplitudes of the current and subsequent waveforms are zero.

In some aspects, the waveform produces an audible and/or tactile response to the touch surface.

In some aspects, the instructions causing the processor to coordinate the transition comprise receiving data indicating the amplitude and direction of the current waveform at predetermined time intervals, stopping propagation of the current waveform and starting propagation of the subsequent waveform at a particular one of the predetermined time intervals, wherein the amplitude and direction of the current waveform and the amplitude and direction of the subsequent waveform at the particular one of the predetermined time intervals are the same.

Alternatively or optionally, the instructions further cause the processor to measure an elapsed time that the touch signal is within a range associated with the feedback control signal; compare the elapsed time to a minimum elapsed time; and in response to the elapsed time being greater than the minimum elapsed time, select the feedback control signal from the plurality of feedback control signals.

In some aspects, the touch signal received comprises a touch location on the touch surface, and the feedback control signal selected is based, at least in part, on the touch location.

In some aspects, the one or more touch sensors comprise one or more force sensors, and the touch signal received from the one or more touch sensors comprises a force signal. In such instances, the instructions may further cause the processor to determine a force magnitude associated with the received force signal, wherein the feedback control signal selected is based, at least in part, on the force magnitude determined. In some instances, the one or more force sensors comprise three or more force sensors, and the instructions further cause the processor to determine a magnitude, acceleration, and/or location of a force applied to the touch surface from the force signals received from the three or more force sensors, wherein the feedback control signal is selected based, at least in part, on the magnitude, acceleration, and/or location of the force applied to the touch surface.

In some aspects, the instructions further cause the processor to measure an elapsed time that the force magnitude is within a range of force magnitude levels associated with the feedback control signal; compare the elapsed time to a minimum elapsed time; and in response to the elapsed time being greater than the minimum elapsed time, select the feedback control signal from the plurality of feedback control signals.

In various instances, each waveform may represent voltage, power, electrical current, and the like.

Also disclosed herein are methods of providing a feedback for an electronic device in response to a touch event to the electronic device. In one aspect, the method comprises receiving a touch signal from one or more touch sensors of the electronic device; selecting a feedback control signal from a plurality of feedback control signals based on the touch signal received, the feedback control signals causing an actuator to propagate at least one pressure wave comprising a waveform, wherein the waveform for each of the plurality of feedback control signals is different; and in response to the touch signal received causing a subsequent feedback control signal to be selected that is different from a current feedback control signal, coordinating a transition from a current waveform associated with the current feedback control signal to a subsequent waveform associated with the subsequent feedback control signal such that an amplitude and a direction of a beginning of the subsequent waveform matches an amplitude and a direction of an ending of the current waveform.

In some instances of the method, the transition occurs when the amplitudes of the current and subsequent waveforms are zero.

In some instances of the method, the waveform produces an audible and/or tactile response.

In some instances, the method step of coordinating the transition further comprises receiving data indicating the amplitude and direction of the current waveform at predetermined time intervals, stopping propagation of the current waveform and starting propagation of the subsequent waveform at a particular one of the predetermined time intervals, wherein the amplitude and direction of the current waveform and the amplitude and direction of the subsequent waveform at the particular one of the predetermined time intervals are the same.

Alternatively or optionally, the method may further comprise measuring an elapsed time that the touch signal is within a range of touch signal levels associated with the feedback control signal; comparing the elapsed time to a minimum elapsed time; and in response to the elapsed time being greater than the minimum elapsed time, selecting the feedback control signal from the plurality of feedback control signals.

In some instances of the method, the touch signal received comprises a touch location on the touch surface, and the feedback control signal selected is based, at least in part, on the touch location.

Alternatively or optionally, the one or more touch sensors may comprise one or more force sensors, and the touch signal received from the one or more touch sensors comprises a force signal. In such instances, the method may further comprise determining a force magnitude associated with the received force signal, wherein the feedback control signal selected is based, at least in part, on the force magnitude determined.

In some aspects, the one or more force sensors comprise three or more force sensors, and the method further comprises determining a magnitude, acceleration, and/or location of a force applied to the touch surface from the force signals received from the three or more force sensors, wherein the feedback control signal is selected based, at least in part, on the magnitude, acceleration, and/or location of the force applied to the touch surface. In such instances, the method may further comprise measuring an elapsed time that the force magnitude is within a range of force magnitude levels associated with the feedback control signal; comparing the elapsed time to a minimum elapsed time; and in response to the elapsed time being greater than the minimum elapsed time, selecting the feedback control signal from the plurality of feedback control signals.

In various aspects, the method may be used with waveforms that represent electrical voltage, electrical power, electrical current, and the like.

BRIEF DESCRIPTION OF THE DRAWINGS

Example features and implementations are disclosed in the accompanying drawings. However, the present disclosure is not limited to the precise arrangements and instrumentalities shown. Similar elements in different implementations are designated using the same reference numerals.

DETAILED DESCRIPTION

Various implementations provide intelligent interruption of waveform-based feedback. Various systems and methods coordinate a transition from a current waveform associated with a current feedback control signal to a subsequent waveform associated with a subsequent feedback control signal such that an amplitude and a direction of a beginning of the subsequent waveform matches an amplitude and a direction of an ending of the current waveform. For purposes of clarity, the direction of the current waveform is negative when the current waveform has a negative slope, and the direction of the current waveform is positive when the current waveform has a positive slope. Similarly, the direction of the subsequent waveform is negative when the subsequent waveform has a negative slope, and the direction of the subsequent waveform is positive when the subsequent waveform has a positive slope For example, various implementations include an electronic device that includes a touch sensitive interface, a waveform actuator, a memory, and a processor. The touch sensitive interface includes one or more touch sensors and a touch surface. The touch sensors identify a touch event on the touch surface. For example, touch sensors may include force-based sensors (e.g., MEMS sensors), capacitive sensors, piezoresistive sensors, mechanical sensors, or other suitable sensor for identifying a touch event on the touch surface.

Example electronic devices include switch assemblies that are installed within an interior cabin of a vehicle, such as the electronic devices described in U.S. Published Patent Application No. 2018/0188876, which is herein fully incorporated by reference in its entirety and made a part hereof. However, this is only a non-limiting example of such electronic devices and this disclosure is not limited to such assemblies or installation environments.

Figure 1A:
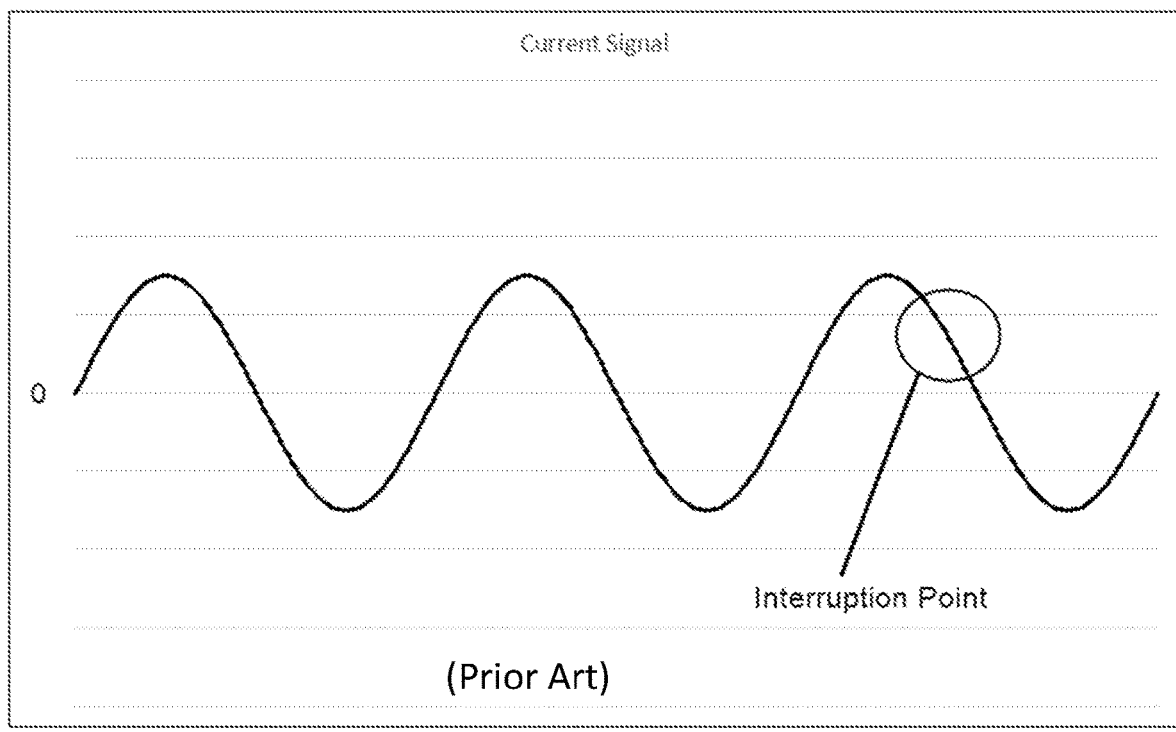
FIGS. 1A-1C illustrates a first waveform signal, a second waveform signal, and discontinuity of a transition between the first waveform signal and the second waveform signal in an example prior art control system.
Figure 1B:
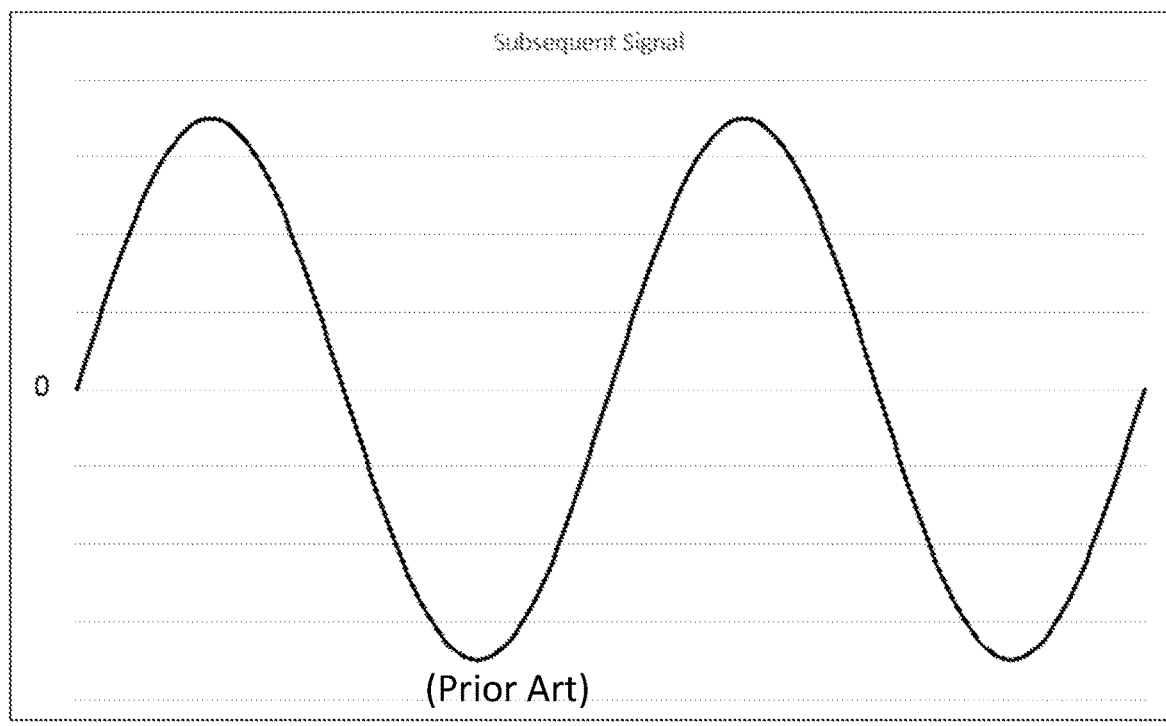
Figure 1C:
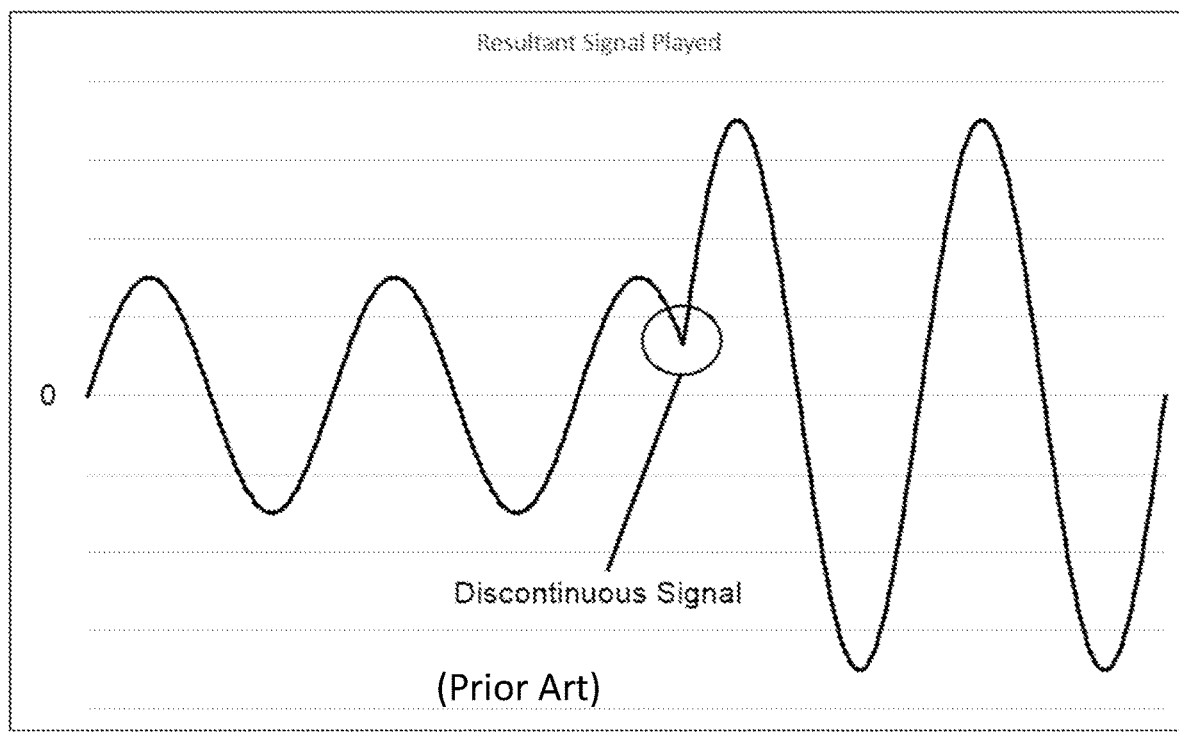
Figure 2:
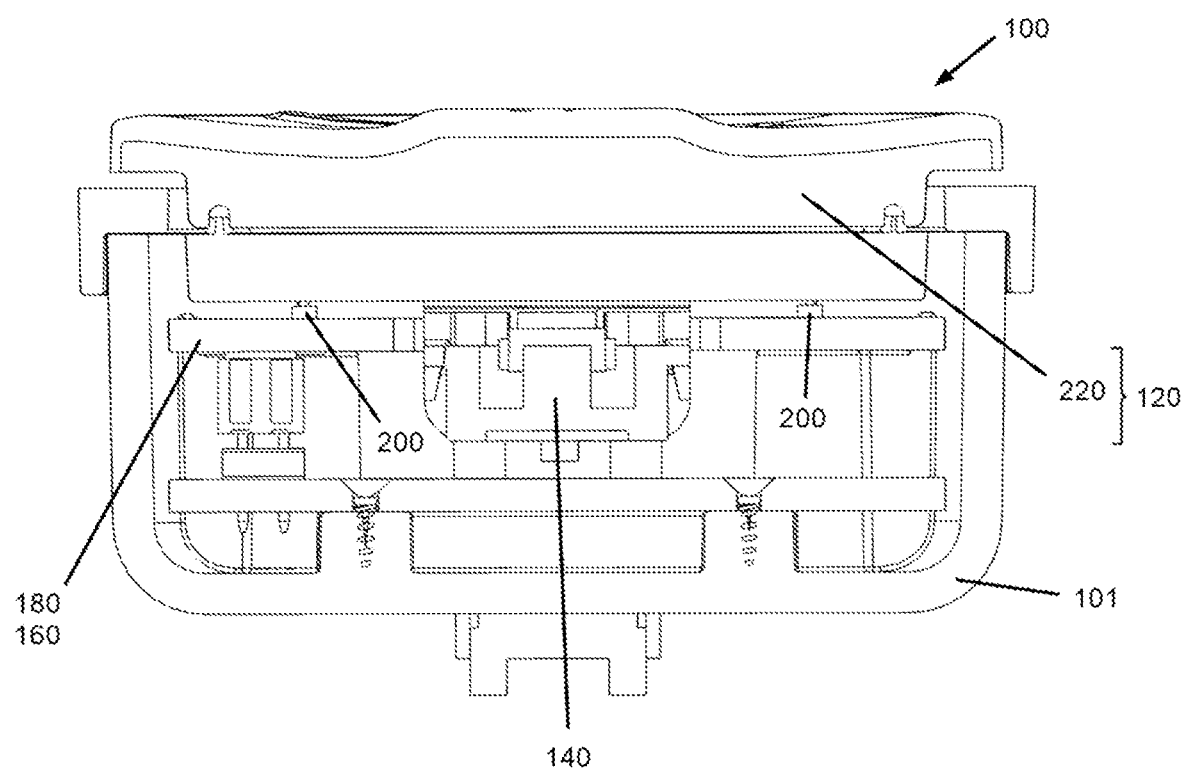
FIG. 2 illustrates a perspective cut-away view of an electronic device according to one implementation.

FIG. 2 illustrates an example electronic device 100 according to one implementation. The electronic device 100 is a switch assembly that can be installed inside an interior cabin of a vehicle (e.g., on a steering wheel in the vehicle, on the door, or on the dashboard) and used to control various vehicle systems, such as entertainment systems, heating and air conditioning systems, display options on a dashboard or elsewhere in a vehicle, phone systems, navigations systems, and vehicle settings. The electronic device 100 includes a touch sensitive interface 120, a waveform actuator 140, a memory 160, and a processor 180. The touch sensitive interface 120 includes one or more touch sensors 200 and a touch surface 220. The touch sensors 200 identify a touch event on the touch surface 220. The touch sensors 200 shown in FIG. 2 are force-based micro electro-mechanical sensors (MEMS) sensors that provide an output signal that corresponds with an amount of force received by the sensors. In addition, output signals from a plurality of MEMS force sensors may be used to identify a touch location on the touch surface 220. For example, the MEMS force sensors are able to detect force with as little as 2 microns of displacement applied to the touch surface 220 in a z-direction (perpendicular to a plane that includes the touch surface 220), according to some implementations. However, in other implementations, the touch sensors may include other suitable types of sensors for identifying a touch event on the touch surface, such as capacitive sensors, piezoresistive sensors, and mechanical sensors.

The processor 180 is in electrical communication with the one or more touch sensors 200, the waveform actuator 140, and the memory 160. In the example shown in FIG. 2, the processor 180 and memory 160 are on a printed circuit board disposed within a housing 101 of the device 100. In addition, the force sensors 200 are disposed on the printed circuit board. However, in other implementations, the processor and/or memory may be disposed outside of the device 100 and/or the touch sensors 200 may be disposed on another rigid surface within the device.

The waveform actuator 140 is disposed within the device 100 such that an output surface of the waveform actuator 140 is adjacent to or abutting a facing surface of the touch sensitive interface 120. For example, the waveform actuator 140 shown in FIG. 2 is a speaker (e.g., a coneless voice coil assembly), and the waveform output is an audible or inaudible sound wave that changes the air pressure near an output surface of the speaker by propagating a plurality of pressure waves along an axis of propagation, which causes vibration of the touch surface 220 in the z-direction. The propagation axis of the actuator 140 shown in FIG. 2 is perpendicular to an output surface of the actuator 140 and the touch surface 220. Thus, at least a portion of the pressure waves propagated from the output surface are directed toward and are captured by the touch surface 220, which causes vibration, or oscillation, of the touch surface 220 in the z-direction.

The processor 180 executes instructions stored on the memory 160. The instructions cause the processor 180 to: (1) receive a touch signal from the one or more touch sensors 200; (2) select a feedback control signal from a plurality of feedback control signals based on the touch signal received, wherein the selected feedback control signal causes the waveform actuator 140 to propagate at least one pressure wave comprising a waveform, wherein the waveform for each of the feedback control signals is different; and (3) in response to the touch signal received causing a subsequent feedback control signal to be selected that is different from a current feedback control signal, coordinate a transition from a current waveform associated with the current feedback control signal to a subsequent waveform associated with the subsequent feedback control signal such that an amplitude and a direction of a beginning of the subsequent waveform matches an amplitude and a direction of an ending of the current waveform.

For example, in some implementations, coordinating the transition from the current waveform to the subsequent waveform includes (1) receiving data indicating the amplitude and direction of the current waveform at predetermined time intervals, and (2) stopping propagation of the current waveform and starting propagation of the subsequent waveform at a particular one of the predetermined time intervals, wherein the amplitude and direction of the current waveform and the amplitude and direction of the subsequent waveform at the particular one of the predetermined time intervals are the same. In the example shown in FIG. 3C, the transition occurs when the amplitudes of the current and subsequent waveforms are zero and the directions of the end of the current waveform and the beginning of the subsequent waveform are positive. In other implementations, the transition may occur when the amplitudes are the same but not necessarily zero and when the directions of the end of the current waveform and the beginning of the subsequent waveform are the same. In addition, in other implementations, the transition may occur when the direction of the end of current waveform and the beginning of the subsequent waveform are negative.

In some implementations, the instructions further cause the processor 180 to: (1) measure an elapsed time that the touch signal is within a range associated with the feedback control signal; (2) compare the elapsed time to a minimum elapsed time; and (3) in response to the elapsed time being greater than the minimum elapsed time, select the feedback control signal from the plurality of feedback control signals. This prevents unintended, brief inputs to the touch interface from resulting in feedback.

In addition, in some implementations, the touch signal received includes a touch location on the touch surface 220, and the feedback control signal selected is based, at least in part, on the touch location.

In implementations in which the one or more touch sensors 200 comprise one or more force sensors, the touch signal received from the one or more touch sensors 200 comprises a force signal. In some implementations, the instructions further cause the processor 180 to determine a force magnitude associated with the received force signal, and the feedback control signal selected is based, at least in part, on the force magnitude determined. In addition, in implementations in which the one or more force sensors includes three or more force sensors, the instructions further cause the processor 180 to determine a magnitude, acceleration, and/or location of a force applied to the touch surface 220 from the force signals received from the three or more force sensors.

For example, in some implementations, the force sensors each receive a portion of the force applied to the touch surface 220, and the force received by each sensor is processed by the processor 180 to determine a position and magnitude of the force applied. The position of the force is determined by the portion of the force received by each force sensor and their known location relative to each other. For example, in some implementations, the force received by each sensor is associated with a resistance. The position of the applied force is measured in either one dimension (e.g., the x- or y-dimension) or two dimensions (e.g., the x- and y-directions or plane), and the magnitude of the force is measured in the z-direction. In implementations that include four force sensors (e.g., in a rectangular arrangement relative to each other), the position of the force is determined by quad-angulation of the force signals received from each sensor. In further or alternative implementations, the position of the force is determined by tri-angulation using three force sensors. For example, if one of the four force sensors fails during operation, the location is determined by tri-angulation using the force signal received from the remaining three sensors.

Furthermore, in certain implementations, the instructions further cause the processor 180 to: (1) measure an elapsed time that the force magnitude is within a range of force magnitude levels associated with the feedback control signal; (2) compare the elapsed time to a minimum elapsed time; and (3) in response to the elapsed time being greater than the minimum elapsed time, select the feedback control signal from the plurality of feedback control signals. For example, the memory 160 stores processing parameters, such as a range of force over time values that indicate an input signal has been received. Input received outside of the range is ignored by the system as unintentional contact with the touch surface 220. For example, in one implementation, the upper limit of the input range is 10N of force applied for 20 seconds or less. Furthermore, in further or additional implementations, the instructions set a force threshold for locking an input area (e.g., 2.5 N) around a location of force input and a second, higher threshold for a force received within the input area for enabling the system 100 (e.g., 3 N). Additional description of force thresholds and virtual input areas are provided in U.S. Patent Application Publication Nos. 2015/0097791 and 2015/0097795, both published Apr. 9, 2015, which are herein fully incorporated by reference in their entireties and made a part hereof.

Figure 3A:
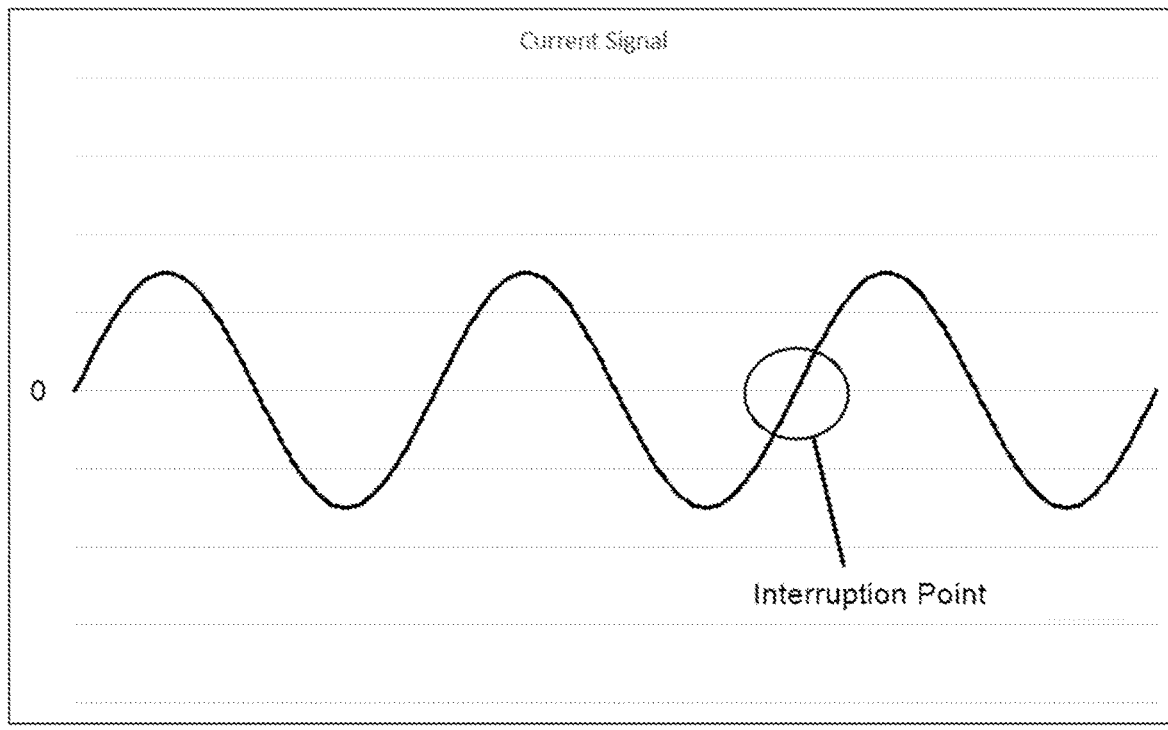
FIGS. 3A-3C illustrates a current waveform signal, a subsequent waveform signal, and a transition between the current waveform signal and the subsequent waveform signal having continuity, according to one implementation.
Figure 3B:
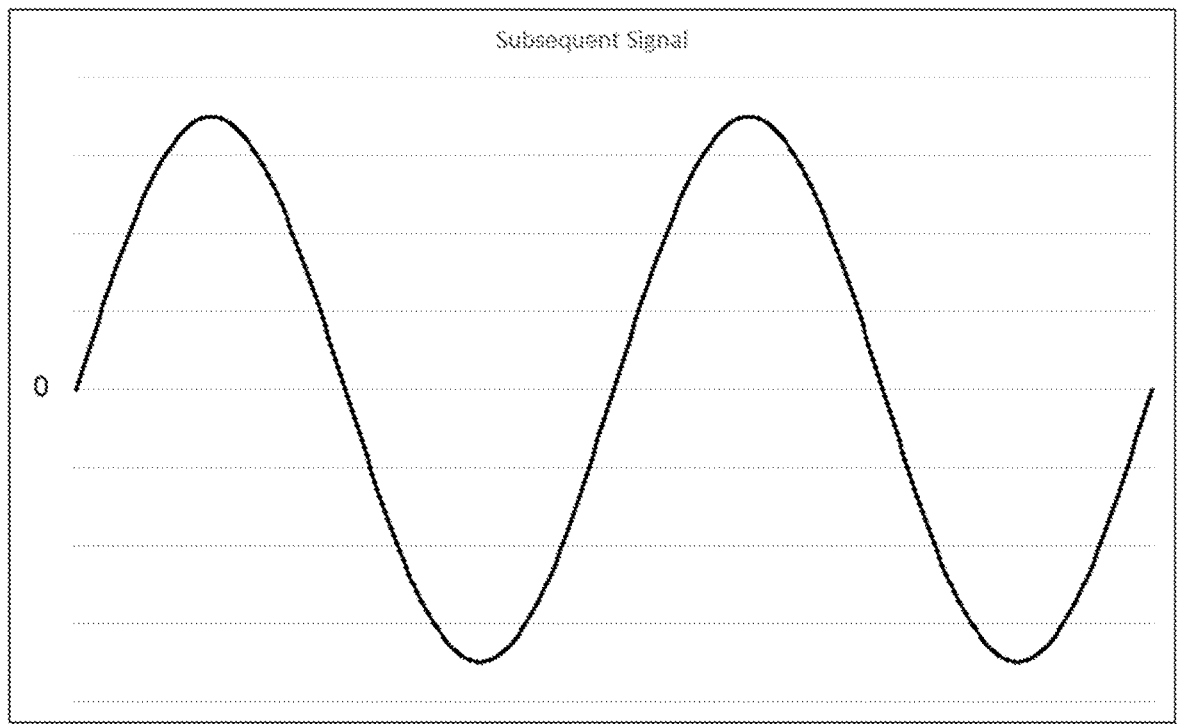
Figure 3C:
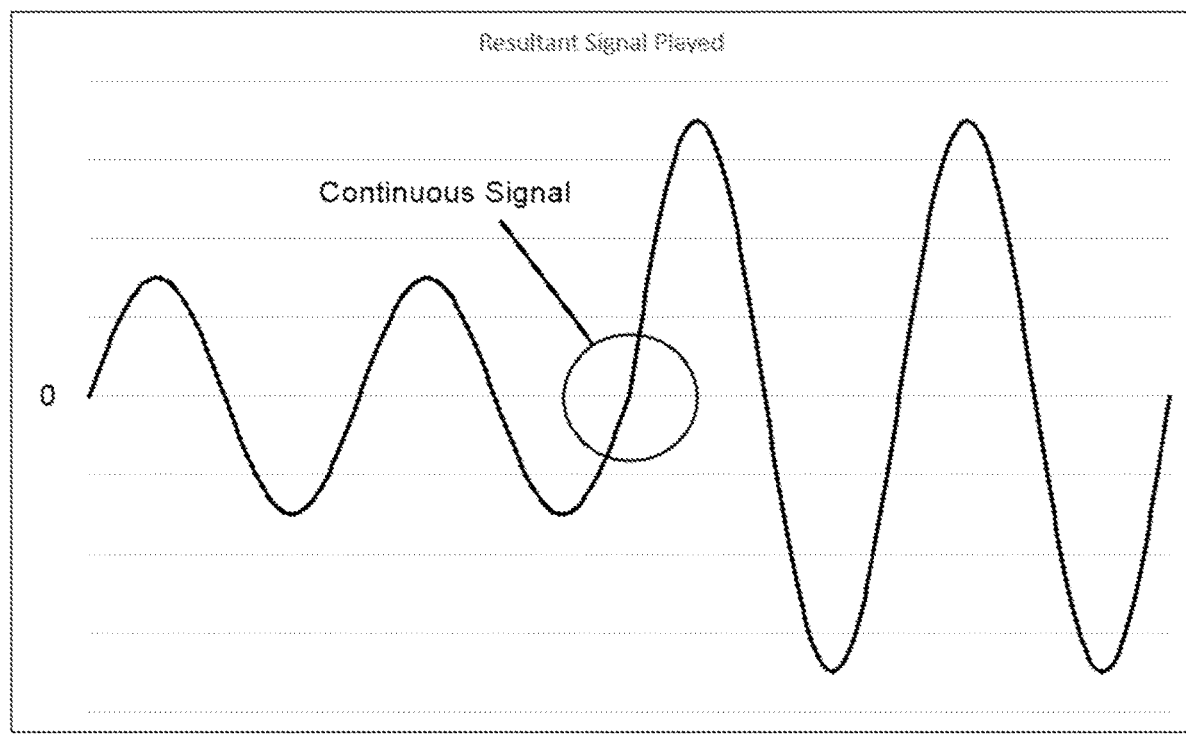

For example, FIGS. 3A-3C illustrate a current waveform signal, a subsequent waveform signal, and a transition between the current waveform signal and the subsequent waveform signal having continuity, according to one implementation. In this example, the waveform signals represent a voltage applied to the waveform actuator 140, but in other implementations, each waveform represents power, current, pressure, and the like.

Figure 4:
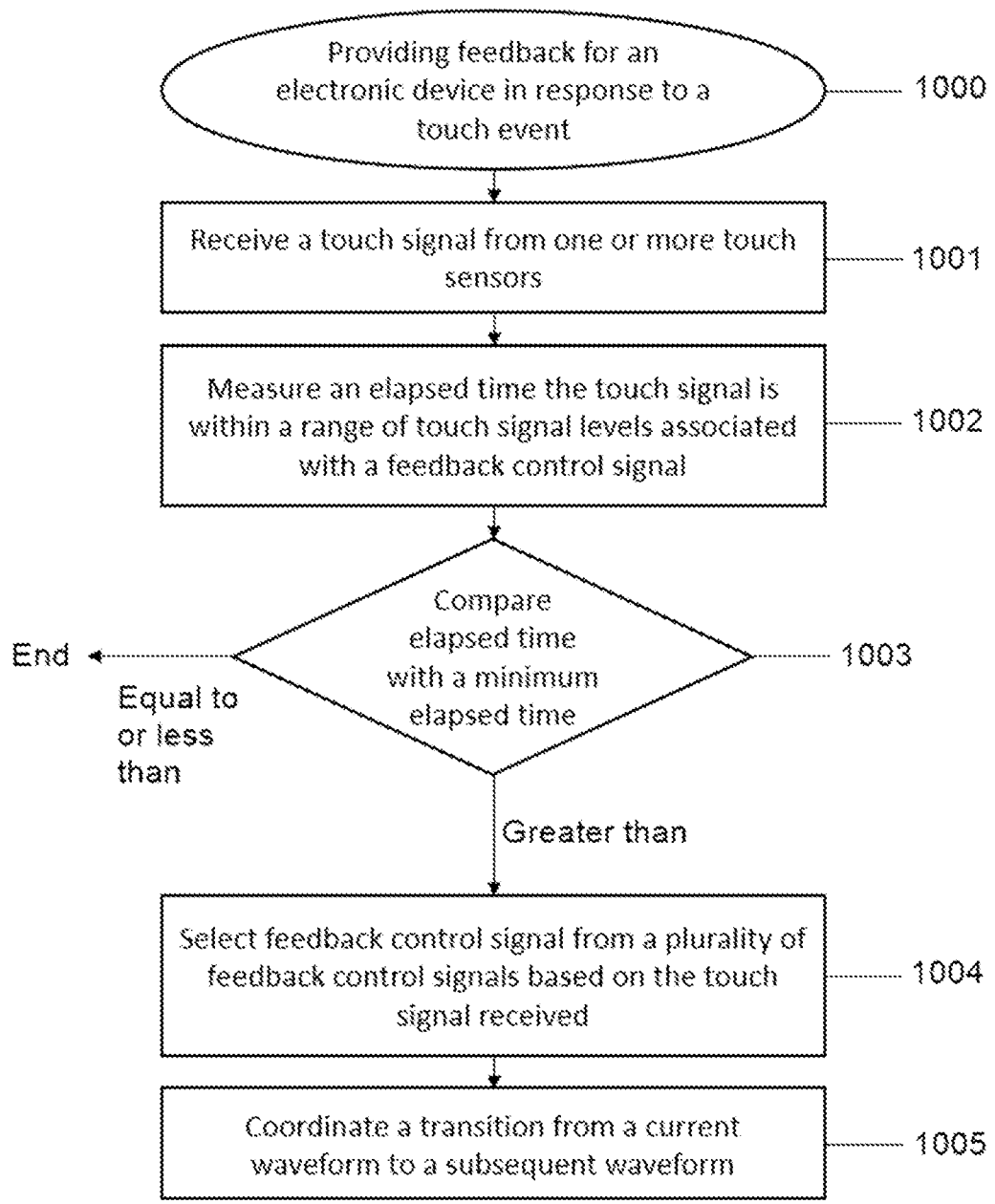
FIG. 4 illustrates a flow chart of a method according to one implementation.

FIG. 4 illustrates a method 1000 of providing a feedback for an electronic device in response to a touch event to the electronic device according to one implementation. The method begins at step 1001 with receiving a touch signal from one or more touch sensors of the electronic device. Then, at step 1002, an elapsed time that the touch signal is within a range of touch signal levels associated with a feedback control signal is measured. Next, at step 1003, the elapsed time is compared to a minimum elapsed time, and in step 1004, in response to the elapsed time being greater than the minimum elapsed time, the feedback control signal is selected from the plurality of feedback control signals based on the touch signal received. For example, the feedback control signal is selected based, at least in part, on the touch location on the touch surface, according to some implementations. The feedback control signals cause a waveform actuator to propagate at least one pressure wave comprising a waveform, wherein the waveform for each of the plurality of feedback control signals is different. Next, in step 1005, in response to the touch signal received causing a subsequent feedback control signal to be selected that is different from a current feedback control signal, a transition is coordinated from a current waveform associated with the current feedback control signal to a subsequent waveform associated with the subsequent feedback control signal such that an amplitude and a direction of a beginning of the subsequent waveform matches an amplitude and a direction of an ending of the current waveform. Coordinating the transition includes receiving data indicating the amplitude and direction of the current waveform at predetermined time intervals and stopping propagation of the current waveform and starting propagation of the subsequent waveform at a particular one of the predetermined time intervals. The amplitude and direction of the current waveform and the amplitude and direction of the subsequent waveform at the particular one of the predetermined time intervals are the same.

In implementations in which the one or more touch sensors are force sensors, the touch signal received from the one or more touch sensors comprises a force signal. And, in steps 1002-1004, a force magnitude associated with the received force signal is determined and the feedback control signal selected is based, at least in part, on the force magnitude determined.

Figure 5:
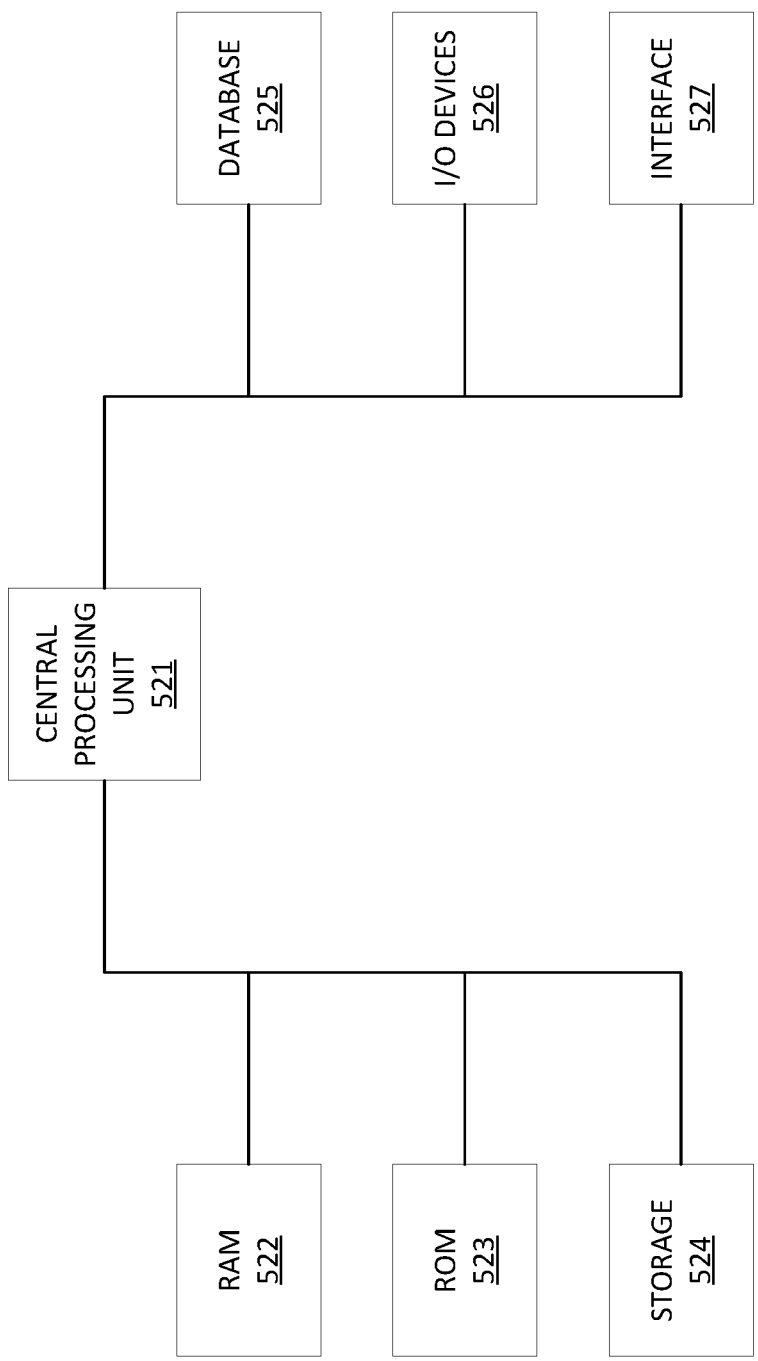
FIG. 5 illustrates an example computer according to aspects of the disclosed implementations.

In implementations in which the one or more force sensors includes three or more force sensors, the method 1000 includes determining a magnitude, acceleration, and/or location of a force applied to the touch surface from the force signals received from the three or more force sensors, and the feedback control signal is selected based, at least in part, on the magnitude, acceleration, and/or location of the force applied to the touch surface FIG. 5 illustrates an example computer. The electronic device 100, as well as other system components, can be implemented with all or some of the components shown in FIG. 5.

The computer may include one or more hardware components such as, for example, a central processing unit (CPU) 521, a random-access memory (RAM) module 522, a read-only memory (ROM) module 523, a storage 524, a database 525, one or more input/output (I/O) devices 526, and an interface 527. Alternatively and/or additionally, the computer may include one or more software components such as, for example, a computer-readable medium including computer executable instructions for performing a method associated with the exemplary embodiments. It is contemplated that one or more of the hardware components listed above may be implemented using software. For example, storage 524 may include a software partition associated with one or more other hardware components. It is understood that the components listed above are examples only and not intended to be limiting.

CPU 521 may include one or more processors, such as processor 180, each configured to execute instructions and process data to perform one or more functions associated with a computer for carrying out the implementations described above. CPU 521 may be communicatively coupled to RAM 522, ROM 523, storage 524, database 525, I/O devices 526, and interface 527. CPU 521 may be configured to execute sequences of computer program instructions to perform various processes. The computer program instructions may be loaded into RAM 522 for execution by CPU 521.

RAM 522 and ROM 523 may each include one or more devices for storing information associated with the operation of CPU 521. For example, ROM 523 may include a memory device configured to access and store information associated with the computer, including information for identifying, initializing, and monitoring the operation of one or more components and subsystems. RAM 522 may include a memory device for storing data associated with one or more operations of CPU 521. For example, ROM 523 may load instructions into RAM 522 for execution by CPU 521. RAM 522 and/or ROM 523 may include memory 160, for example.

Storage 524 may include any type of mass storage device configured to store information that CPU 521 may need to perform processes consistent with the disclosed embodiments. For example, storage 524 may include one or more magnetic and/or optical disk devices, such as hard drives, CD-ROMs, DVD-ROMs, or any other type of mass media device.

Database 525 may include one or more software and/or hardware components that cooperate to store, organize, sort, filter, and/or arrange data used by CPU 521. For example, database 525 may store data relating to the waveforms to be generated based on the input received. It is contemplated that database 525 may store additional and/or different information than that listed above.

I/O devices 526 may include one or more components configured to communicate information with a user associated with the device shown in FIG. 5. For example, I/O devices 526 may include a console with an integrated keyboard and mouse to allow a user to maintain a historical database of information, update associations, and access digital content. I/O devices 526 may also include a display including a graphical user interface (GUI) for outputting information on a monitor. I/O devices 526 may also include peripheral devices such as a printer for printing information associated with the computer, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 527 may include one or more components configured to transmit and receive data via a communication network, such as the Internet, a local area network, a workstation peer-to-peer network, a direct link network, a wireless network, or any other suitable communication platform. For example, interface 527 may include one or more modulators, demodulators, multiplexers, demultiplexers, network communication devices, wireless devices, antennas, modems, and any other type of device configured to enable data communication via a communication network.

Any combination of one or more computer readable medium(s) may be utilized. The computer readable medium may be a computer readable signal medium or a computer readable storage medium. A computer readable storage medium may be, for example, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer readable medium may be transmitted using any appropriate medium, including but not limited to wireless, wireline, optical fiber cable, RF, etc., or any suitable combination of the foregoing.

Computer program code may be written in any combination of one or more programming languages, including an object-oriented programming language such as Java, Smalltalk, C++, or the like, and conventional procedural programming languages, such as the "C" programming language or similar programming languages. The program code may execute entirely on the computing unit.

It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

A number of example implementations are provided herein. However, it is understood that various modifications can be made without departing from the spirit and scope of the disclosure herein. As used in the specification, and in the appended claims, the singular forms "a," "an," and "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

Disclosed are materials, systems, devices, methods, compositions, and components that can be used for, can be used in conjunction with, can be used in preparation for, or are products of the disclosed methods, systems, and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a device is disclosed and discussed each and every combination and permutation of the device, and the modifications that are possible, are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

The invention claimed is:

1. An electronic device comprising:
a touch sensitive interface comprising one or more touch sensors and a touch surface, the touch sensors identifying a touch event on the touch surface;
a waveform actuator;
a memory; and
a processor, the processor in electrical communication with the one or more touch sensors, the waveform actuator, and the memory, wherein the processor executes instructions stored on the memory, the instructions causing the processor to:
propagate, by the waveform actuator, a first pressure wave comprising a first waveform during a first time period, wherein a first feedback control signal causes the waveform actuator to propagate the first pressure wave during the first time period;
receive a touch signal from the one or more touch sensors, wherein the touch signal is received at any point during the first time period;
in response to receiving the touch signal, select a second feedback control signal from a plurality of feedback control signals based on the touch signal received, the selected second feedback control signal causing the waveform actuator to propagate a second pressure wave comprising a second waveform during a second time period, wherein each waveform for each of the feedback control signals is different and wherein the second time period is immediately adjacent to and following the first time period; and
in response to the touch signal received causing the second feedback control signal to be selected that is different from the first feedback control signal, coordinate a transition from the first waveform associated with the first feedback control signal during the first time period to the second waveform associated with the second feedback control signal during the second time period such that at the transition an amplitude and a direction of a beginning of the second waveform at a beginning of the second time period matches an amplitude and a direction of an ending of the first waveform at an end of the first time period, wherein an audible and/or tactile response to the touch surface is produced by only the first waveform during the first time period and only by the second waveform during the second time period.

2. The electronic device of claim 1, wherein the transition occurs when the amplitudes of the first and second waveforms are zero.

3. The electronic device of claim 1, wherein the audible and/or tactile response to the touch surface produced by the first waveform during the first time period is different from the audible and/or tactile response to the touch surface produced by the second waveform during the first time period.

4. The electronic device of claim 1, wherein instructions causing the processor to coordinate the transition comprise:
receiving data indicating the amplitude and direction of the first waveform at predetermined time intervals,
stopping propagation of the first waveform and starting propagation of the second waveform at a particular one of the predetermined time intervals, wherein the amplitude and direction of the first waveform and the amplitude and direction of the second waveform at the particular one of the predetermined time intervals are the same.

5. The electronic device of claim 1, wherein the direction of the first waveform is negative when the first waveform has a negative slope, and the direction of the first waveform is positive when the first waveform has a positive slope.

6. The electronic device of claim 1, wherein the instructions further cause the processor to:
measure an elapsed time that the touch signal is within a range associated with the feedback control signal;
compare the elapsed time to a minimum elapsed time; and
in response to the elapsed time being greater than the minimum elapsed time, select the second feedback control signal from the plurality of feedback control signals.

7. The electronic device of claim 1, wherein the touch signal received comprises a touch location on the touch surface, and the feedback control signal selected is based, at least in part, on the touch location.

8. The electronic device of claim 1, wherein each waveform represents voltage.

9. The electronic device of claim 1, wherein each waveform represents power.

10. The electronic device of claim 1, wherein each waveform represents current.

11. A method of providing a feedback for an electronic device in response to a touch event to the electronic device, the method comprising:
propagating a first pressure wave comprising a first waveform during a first time period, wherein a first feedback control signal causes the first pressure wave to be propagated by an actuator during the first time period;
receiving a touch signal from one or more touch sensors of the electronic device identifying a touch event on a touch surface, wherein the touch signal is received at any point during the first time period;
in response to receiving the touch signal, selecting a second feedback control signal from a plurality of feedback control signals based on the touch signal received, the second feedback control signals causing the actuator to propagate a second pressure wave comprising a second waveform during a second time period, wherein each waveform for each of the plurality of feedback control signals is different and wherein the second time period is immediately adjacent to and following the first time period; and
in response to the touch signal received causing the second feedback control signal to be selected that is different from the first feedback control signal, coordinating a transition from the first waveform associated with the first feedback control signal during the first time period to the second waveform associated with the second feedback control signal during the second time period such that at the transition an amplitude and a direction of a beginning of the second waveform at a beginning of the second time period matches an amplitude and a direction of an ending of the first waveform at an end of the first time period;

wherein an audible and/or tactile response to the touch surface is produced by only the first waveform during the first time period and only by the second waveform during the second time period.

12. The method of claim 11, wherein the transition occurs when the amplitudes of the first and the second waveforms are zero.

13. The method of claim 11, wherein coordinating the transition further comprises:

receiving data indicating the amplitude and direction of the first waveform at predetermined time intervals, stopping propagation of the first waveform and starting propagation of the second waveform at a particular one of the predetermined time intervals, wherein the amplitude and direction of the first waveform and the amplitude and direction of the second waveform at the particular one of the predetermined time intervals are the same.

14. The method of claim 11, wherein the direction of the first waveform is negative when the first waveform has a negative slope, and the direction of the first waveform is positive when the first waveform has a positive slope.

15. The method of claim 11, wherein the one or more touch sensors comprise three or more force sensors, and the touch signal received from the one or more touch sensors comprises a force signal, and the method further comprises determining a force magnitude, acceleration, and/or location of a force applied to the touch surface from the force signals received from the three or more force sensors, wherein the second feedback control signal is selected based, at least in part, on at least one of the determined force magnitude, determined acceleration, and/or determined location of the force applied to the touch surface.

16. The method of claim 15, further comprising:

measuring an elapsed time that the force magnitude is within a range of force magnitude levels associated with the feedback control signal;

comparing the elapsed time to a minimum elapsed time; and in response to the elapsed time being greater than the minimum elapsed time, selecting the second feedback control signal from the plurality of feedback control signals.

17. The method of claim 11, wherein each waveform represents voltage.

18. The method of claim 11, wherein each waveform represents power.

19. The method of claim 11, wherein each waveform represents current.

* * * * *